United States Patent [19]

Borbone

[11] Patent Number: 5,435,349

[45] Date of Patent: Jul. 25, 1995

[54] VALVE BLOCK ASSEMBLY FOR I.S. MACHINE

[75] Inventor: Joseph A. Borbone, Paxton, Mass.

[73] Assignee: Emhart Glass Machinery Investments Inc., Wilmington, Del.

[21] Appl. No.: 48,141

[22] Filed: Apr. 15, 1993

[51] Int. Cl.⁶ .................................................. F16K 11/00
[52] U.S. Cl. .................................. 137/884; 137/269
[58] Field of Search ............. 137/884, 269, 270, 454.6

[56] References Cited

U.S. PATENT DOCUMENTS

| | | | |
|---|---|---|---|
| 3,918,489 | 11/1975 | Foster et al. | 137/884 X |
| 4,293,004 | 10/1981 | Lowe | 137/884 |
| 4,478,241 | 10/1984 | Cardenas-Franco et al. | 137/884 X |
| 4,938,258 | 7/1990 | Sato | 137/884 |

*Primary Examiner*—John C. Fox
*Attorney, Agent, or Firm*—Spencer T. Smith

[57] ABSTRACT

A valve block assembly for controlling the flow of operating air to air operated mechanisms of a section of an I.S. machine comprising at least one valve block including a plurality of valves, each of the valves having an inlet chamber for receiving operating air, a conduit associated with each valve for directing operating air away from the valve towards the air operated mechanisms or for directing exhaust air from the air operated mechanism to the valve, and an exhaust channel for directing exhaust air away from the valves, and a manifold including means for supplying operating air to the inlet chambers, an exhaust channel for receiving exhaust air from the valve block exhaust channel, and a corresponding plurality of conduits communicating with the valve block conduits for delivering exhaust air from the air operated mechanisms to the valve block conduits or for directing operating air received from the valve block conduits towards the air operated mechanisms.

1 Claim, 5 Drawing Sheets

VALVE BLOCK ASSEMBLY FOR I.S. MACHINE

The present invention relates to I.S. (individual section) machines which make glass containers from molten gobs of glass.

Each individual section of an I.S. machine has a blank side which forms a parison from the gob in a blank side mold and a blow side which forms the final glass container from the parison in a blow side mold. A number of movable mechanisms such as a blank side mold opening and closing mechanism, a plunger mechanism to be moved into a gob contained within the blank side mold, an invert mechanism for taking the formed parison and carrying it to the blow side, a blow side mold opening and closing mechanism, a takeout for removing the formed glass container from the blow side and depositing it on a dead plate and a pusher which will displace a bottle from the dead plate onto a conveyor are associated with each section and these mechanisms require air having a variety of pressures.

To control the application of this air, each section has a valve block which supports a number of on/off valves which are operated by electronically controlled solenoids. A prior art valve block is shown in U.S. Pat. Nos. 3,918,489 and 4,382,451.

It is an object of the present invention to provide an improved valve block for a section of an I.S. machine.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is a front view of the valve block manifold;

FIG. 3 is a view taken at 3—3 of FIG. 2;

FIG. 4 is a view taken at 4—4 of FIG. 2;

FIG. 5 is a view taken at 5—5 of FIG. 2;

Figure 1:
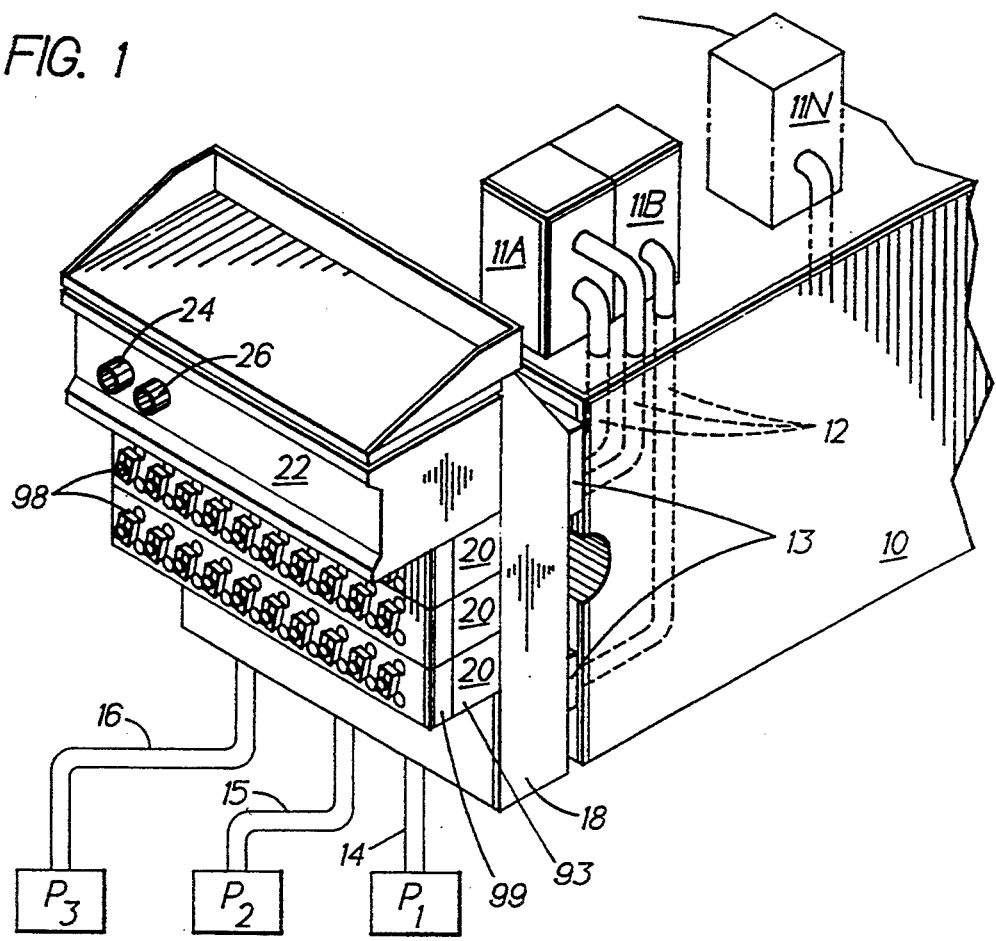
FIG. 1 is a schematic illustration of the valve block assembly made in accordance with the teachings of the present invention connected to an individual section of an I.S. machine.

FIG. 1 is a schematic showing of a portion of one of the plurality (6,8,10,12, for example) of sections of an I.S. machine. The section frame 10 supports a number of air operated mechanisms 11A, 11B . . . 11N such as an invert, takeout, mold opening and closing mechanism, etc. which have to be repeatedly displaced. U.S. Pat. No. 4,362,544 describes in detail these mechanisms. The air lines 12 for these mechanisms are connected to one or more "KISS" plates 13.

While in the preferred embodiment, the manifold surface engages the surface of the kiss plates at one side of the kiss plates and discrete air lines are connected to the other side of the kiss plate, the kiss plates could be eliminated and the discrete air lines could be connected to the conduits 70 of the manifold. High pressure P1, low pressure P2 and pilot air P3 are supplied through pipes 14, 15, 16 to a manifold 18 and from the manifold to the valve blocks 20. This high and low pressure air is selectively redirected back to the manifold where it is directed through passages in the manifold to associated passages in the kiss plates and into the frame conduits 12. As shown, one mechanism 11A has two air lines and could, for example, include a three way valve, whereas mechanism 11B has only one air line and could, for example, include a pilot operated valve with either low pressure or high pressure air serving as this pilot air. A console 22 is located above the valve blocks and houses the electronics for controlling the solenoid valves. A machine stop button 24 and associated machine stop light 26 may be located on the front of the console.

FIG. 2 is a front view of the manifold showing the surface on which the valve blocks are to be mounted. As can be seen, there are three horizontal rows of ten exit apertures 30 each having upper 31 and lower 32 semi circular segments separated by a divider 33. The upper exit apertures 31 of each row communicate with a horizontally extending internal chamber 34 which is supplied with high pressure air. FIG. 3 shows how high pressure air is fed through an opening 35 in the base 36 into a vertically extending channel 37 which communicates with these high pressure chambers 34.

The lower exit apertures 32 of the upper two rows communicate with horizontally extending internal chambers 38 which are supplied with low pressure air. FIG. 3 also shows how low pressure air is fed through a base opening 39 into a vertically extending channel 40 which communicates with these low pressure chambers 38. This vertical low pressure channel 40 also communicates with a horizontally extending chamber 42 which communicates with the two low pressure exit apertures on the right hand end of the lowermost row. A separate chamber 44 communicates with the lower exit apertures of the two left hand apertures in the lowermost row and this chamber also is in communication with the low pressure vertical channel 40.

Referring to FIGS. 2 and 4, the lower exit aperture of each of the central six apertures of the lowermost row communicates with its own vertical channel 50. These channels have a normally open opening 51 at the bottom and a pair of aligned holes 52, 53 in the front 54 and rear 55 channel walls. By plugging 56 both aligned holes of these six vertical channels and by connecting these channels through the opening 51 at the bottom to an independent pressure source, these channels can be connected to a pressure source having a pressure other than high and low pressure. These inlets 51 can accordingly be connected to a unique pressure such as plunger up pressure P4 or counterblow pressure P5. In the illustrated embodiment which is to control a triple gob machine, six special conduits are provided for the three plunger up lines and the three counterblow lines. Should special pressures not be required, the bottom holes 51 to these six (or any of them) can be plugged and the plugs in the rear walls 55 can be removed (access by removing the plug in the front wall) so that low pressure air from a chamber 58 which is located behind these channels 50 and which communicates with the low pressure vertical channel 40, will enter these individual chambers 50 to supply the lower apertures with low pressure air. Pilot air (P3) is supplied to the valve blocks through piping 60 having an exit port 62 for each block and exhaust air exhausted from each block will be exhausted through a vertical exhaust channel 64.

For every exit aperture 30 in the manifold there is a conduit 70 (FIGS. 4 and 5) having an aperture 72 communicating with the front surface of the manifold and an aperture 74 communicating with one of the rear surfaces 13A, 13B of the manifold that will engage a kiss plate 13. The manifold (FIG. 2) also has an opening 76 at the bottom front left which will receive an electronic receptacle with the cable passing through a channel in the manifold up to the top chamber 78 so that the cable can be fed into the console through an opening at the rear of the console. Gaskets located between the mating surfaces of the kiss plates and the manifold and between the manifold and the valve blocks will effect the desired air tight seals.

Figure 6:
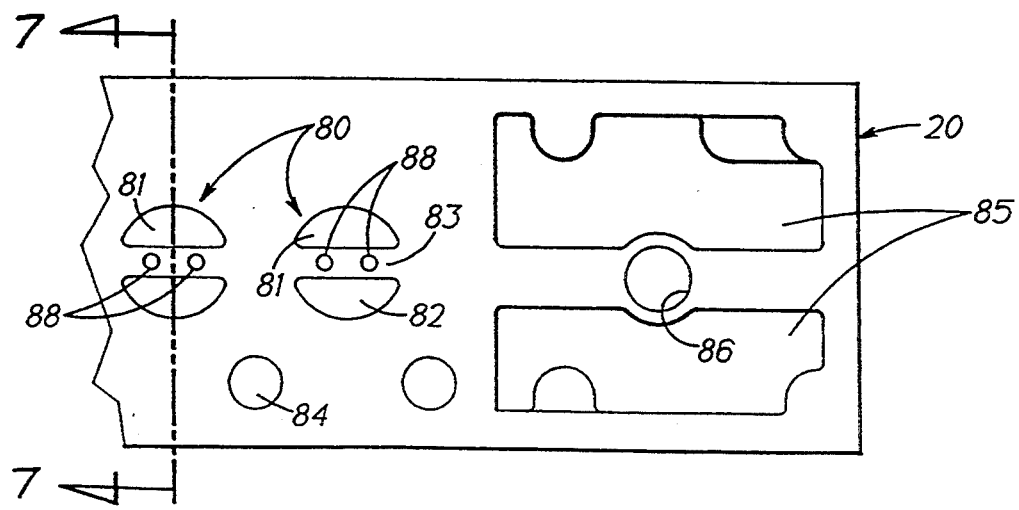
FIG. 6 is a rear view of a portion of one of the valve blocks which will engage the manifold.
Figure 7:
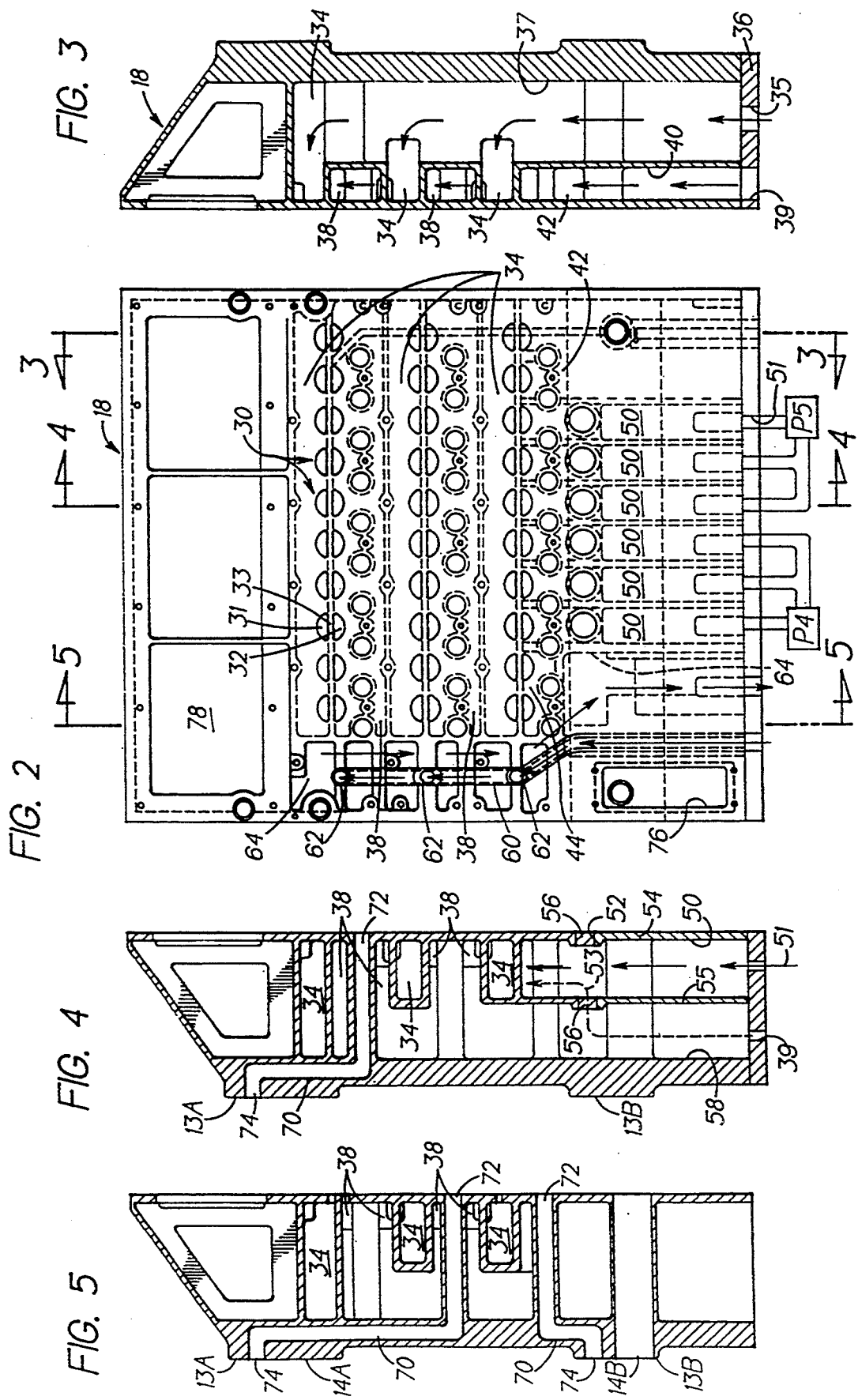
FIG. 7 is a view taken at 7—7 of FIG. 6.
Figure 8:
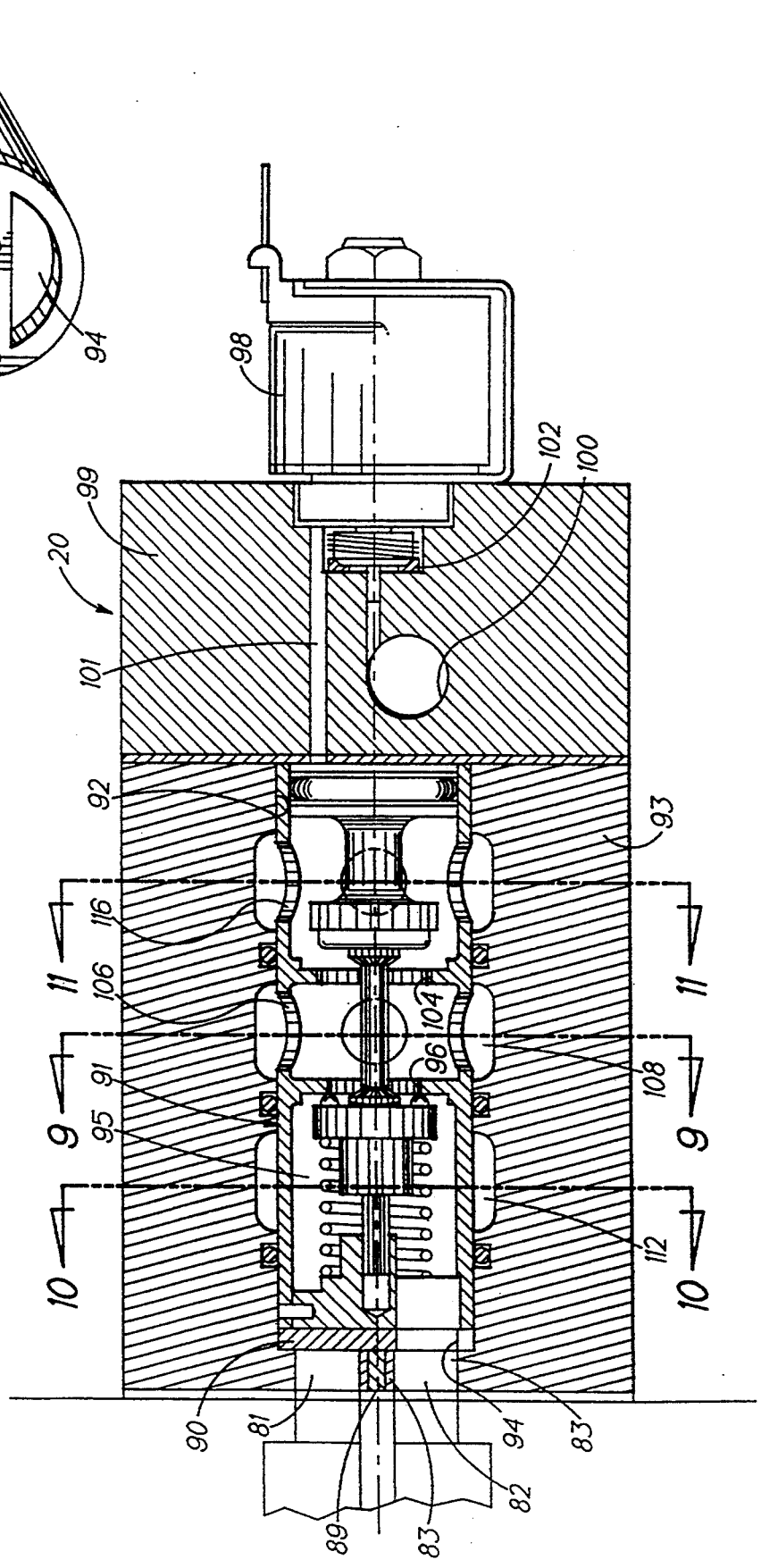
FIG. 8 is an oblique view of one end of a valve cartridge used in the valve block.
Figure 9:
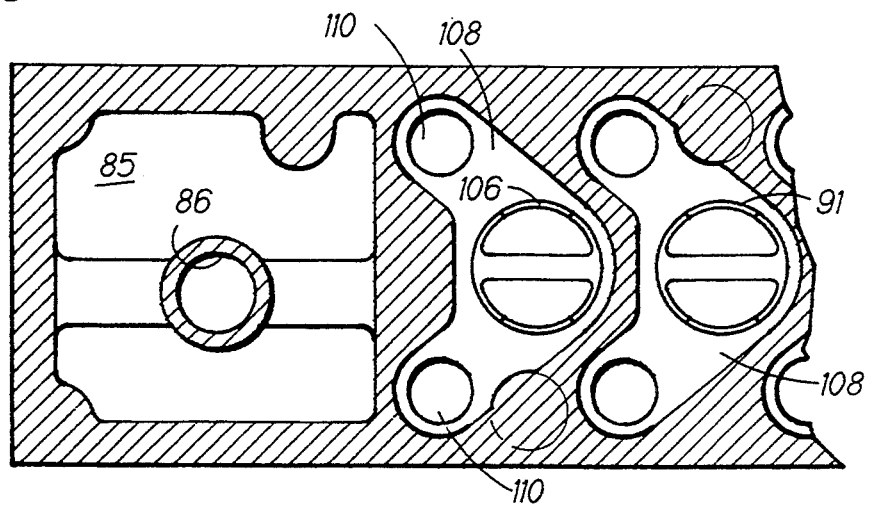
FIG. 9 is a view taken at 9—9 of FIG. 7.
Figure 10:
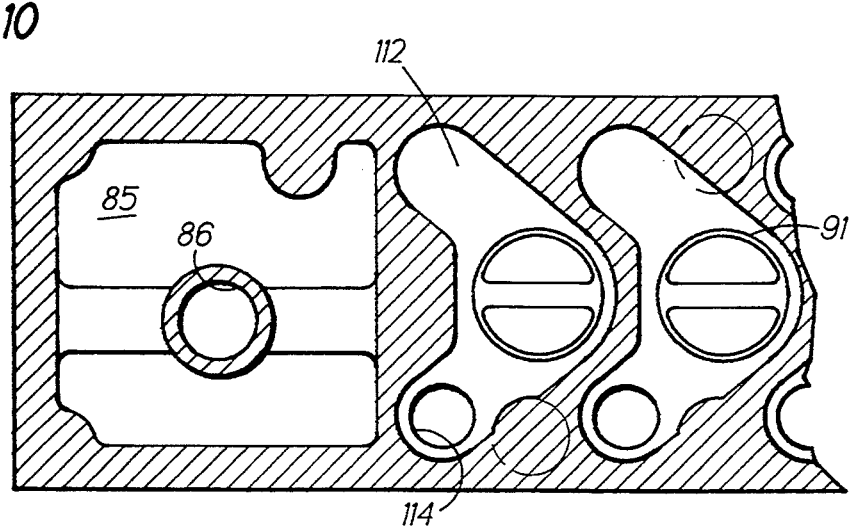
FIG. 10 is a view taken at 10—10 of FIG. 7.

Associated with each row of ten exit apertures 30 is a valve block 20 having corresponding inlet apertures. As can be seen from FIG. 6, which views a portion of the rear face of the valve block 20 which is to engage the manifold, each valve block includes inlet apertures 80 having upper 81 and lower 82 semi circular segments separated by a divider 83, an inlet exit aperture 84, an exhaust channel 85 and a pilot bore 86 which will communicate respectively with the matched exit apertures 30, inlet/exit aperture 72, pilot exit port 62 and exhaust channel 64 of the manifold. The divider has two through holes 88 which receive end pins 89 secured to the resilient end cap 90 of the cylindrical sleeve 91 of a cartridge valve (FIGS. 7 and 8). The sleeve is received by a suitable blind bore 92 in the valve block body 93 of a valve block 20. The valve sleeve 91 can be oriented with the inlet aperture 94, which is a circular segment matching a circular segment 81, 82 of the inlet aperture 80 of the block, either in communication with the low pressure inlet aperture 82 as shown or the cartridge can be rotated 180° with the pins 89 again inserted into the divider holes 88 to locate this inlet aperture 94 in communication with the high pressure inlet aperture 81. A chamber is accordingly defined including the aperture 94 in the end cap 90, the aligned hole 81 or 82 in the valve block and an internal cavity 95 in the sleeve 91. The cartridge valve will accordingly supply either high or low pressure air to a supply port 96 which is controlled by a solenoid 98 which is mounted on the solenoid mounting block portion 99 of the valve block. The solenoid mounting block portion clamps the cartridge valve within the blind bore 92 and hence, forces the resilient end cap 90 against the end of the blind bore to seal the operative inlet opening 81 or 82. The pilot air bore 86 extends through the valve block body and communicates with a pilot air line 100 in the solenoid mounting block portion which communicates with an air line 101 communicating with each cartridge valve via a solenoid 98 controlled seal 102. Should the illustrated pilot operated solenoids be replaced with solenoids not requiring pilot air, these pilot air lines could be eliminated. When the solenoid is off, the cartridge valve supply port 96 is closed and the cartridge valve exhaust port 104 is open. When the solenoid is operated the solenoid armature moves the seal to allow pilot air to operate the cartridge valve. When the solenoid is on, the valve element 105 is axially displaced from the illustrated position to its second position where the exit port 104 is closed and the supply port 96 is open. Pressurized air then passes through the supply port 96 and through sleeve apertures 106 into a kidney shaped chamber 108 (see also FIG. 9) where it can flow through parallel conduits 110 into another kidney shaped chamber 112 (see FIG. 10) which surrounds the sleeve, leaving that chamber through a conduit 114 which is in communication with an associated manifold conduit 70. Optionally, the valve as used might be a normally open valve. Flow through these parallel conduits 110 can be controlled in a conventional manner with the use of full or half plugs and meter in or out check valves in one of these conduits and the selective use of a half plug or a needle valve, where required, in the other conduit.

Figure 11:
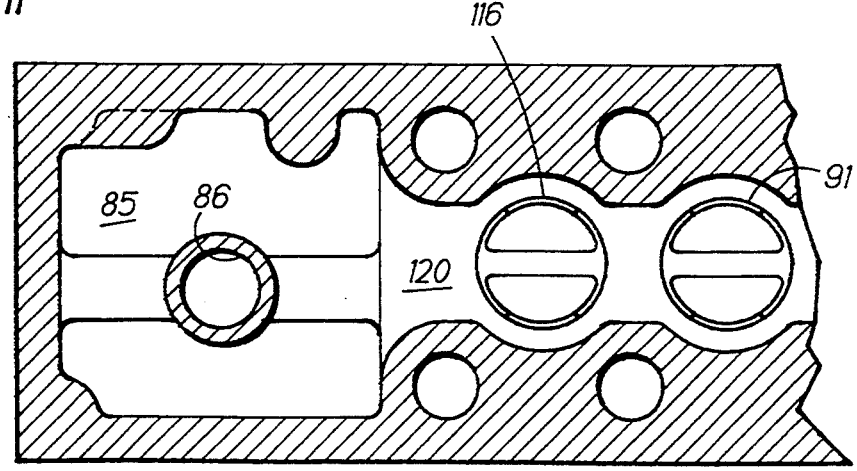
FIG. 11 is a view taken at 11—11 of FIG. 7.

When the solenoid is off exhaust air will proceed from the mechanism 11A, etc. through the manifold conduit 70, through the conduit 114 of the valve block into the first kidney shaped chamber 112, then through one or both of the parallel conduits 110 into the second kidney shaped chamber 108, through one set of sleeve holes 106 into the sleeve 91, through the exit port 104 of the cartridge valve, through a set of exit apertures 116 in the sleeve to a channel 120 (FIG. 11) which communicates with the exhaust channel 85.

Figure 12:
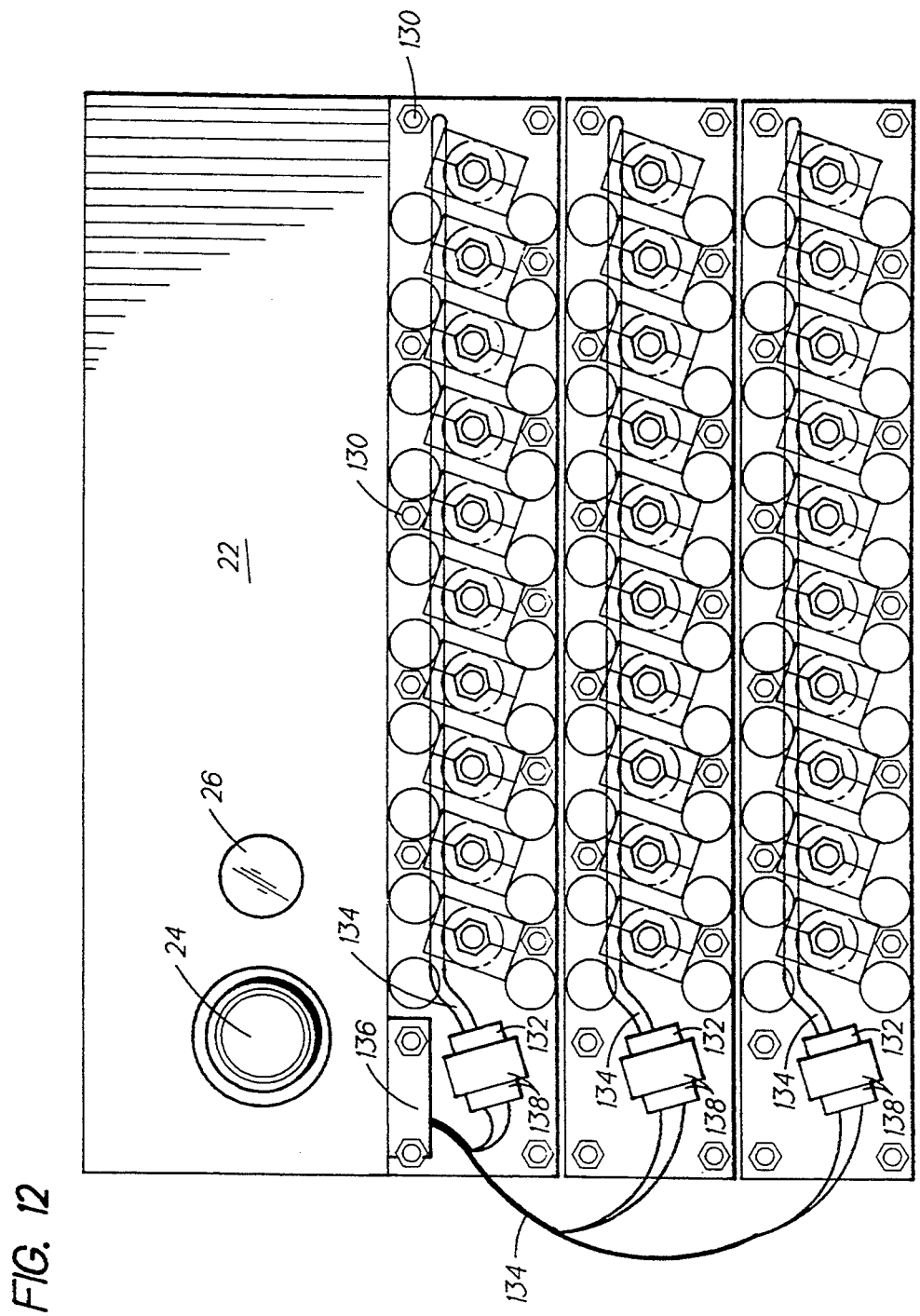
FIG. 12 is a front view of the electronics console and the valve blocks.

Referring to FIG. 12, each valve block can be quickly and easily replaced with an identically configured valve block in the event a failure occurs. Each valve block is secured to the manifold with bolts 130 so that mechanical separation is quick and simple. The solenoids for each block are wired from a receptacle 132 secured to the block wiring harness 134. Electrical connection to the console is effected with a single quick release coupling 136 which can be released from the console and the three individual couplings 138 can be quickly released from the three valve block receptacles 132. By removing the coupling 138 from the valve block to be removed and the console coupling 136 in the event the upper valve block is to be removed, any valve block can be removed (and replaced) quickly and simply.

I claim:
1. A valve block assembly for controlling the flow of operating air to air operated mechanisms of a section of an I.S. machine comprising
   a valve block including
      a plurality of valves,
      each of said valves having an inlet chamber, said inlet chambers arranged in a row, and
   a manifold for supplying air under pressure to said inlet chambers including
      channel means having an inlet for supplying air having a selected pressure to some of said inlet chambers,
      an individual conduit having a selectively closeable inlet for supplying air under pressure to each of the remaining inlet chambers,
      said channel means and each of said individual conduits having a common wall with a hole therethrough,
   releasable means for closing each of said holes,
   each of said individual conduits having a selectively closeable access hole through which said releasable means can be accessed,
   whereby when the inlet and access hole of an individual conduit are closed, air having said selected pressure can be directed through the common wall hole therein into said individual conduit and
   whereby when the access and common wall holes of said individual conduit are closed air can be directed through the inlet of said individual conduit into said individual conduit.

* * * * *